(12) United States Patent
Patel et al.

(10) Patent No.: US 7,607,226 B2
(45) Date of Patent: Oct. 27, 2009

(54) INTERNAL FUEL MANIFOLD WITH TURNED CHANNEL HAVING A VARIABLE CROSS-SECTIONAL AREA

(75) Inventors: Bhawan B. Patel, Mississauga (CA); Jason Fish, Brampton (CA); Dany Gaudet, Longueull (CA); Lafleche Gagnon, Ste-Julie (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 443 days.

(21) Appl. No.: 11/366,814

(22) Filed: Mar. 3, 2006

(65) Prior Publication Data

US 2007/0204622 A1   Sep. 6, 2007

(51) Int. Cl.
*B21D 51/16* (2006.01)
*F02C 1/00* (2006.01)

(52) U.S. Cl. .............. 29/890.08; 29/889.2; 60/739; 60/740; 60/746; 60/747

(58) Field of Classification Search .............. 29/888.01, 29/888.02, 890.08, 889.2, 451, 557; 60/739, 60/740, 746, 747
See application file for complete search history.

(56) References Cited

U.S. PATENT DOCUMENTS

| | | |
|---|---|---|
| 2,151,540 A | 3/1939 | Varga |
| 2,946,185 A | 7/1960 | Bayer |
| 3,213,523 A | 10/1965 | Boehler |
| 3,472,025 A | 10/1969 | Simmons et al. |
| 3,877,249 A * | 4/1975 | Sager ............................ 63/15 |
| 4,100,733 A | 7/1978 | Streibel et al. |
| 4,322,945 A | 4/1982 | Peterson et al. |
| 4,404,806 A | 9/1983 | Bell, III et al. |
| 4,706,354 A | 11/1987 | Naudet et al. |
| 4,947,535 A | 8/1990 | Cowles |
| 4,947,715 A | 8/1990 | Council, Jr. |
| 5,003,678 A | 4/1991 | Oganesyan |
| 5,036,657 A | 8/1991 | Seto et al. |
| 5,253,471 A | 10/1993 | Richardson |
| 5,271,219 A | 12/1993 | Richardson |
| 5,396,759 A | 3/1995 | Richardson |
| 5,400,968 A | 3/1995 | Sood |
| 5,419,115 A | 5/1995 | Butler et al. |
| 5,423,178 A | 6/1995 | Mains |
| 5,570,580 A | 11/1996 | Mains |

(Continued)

FOREIGN PATENT DOCUMENTS

CA    1013153    7/1977

(Continued)

OTHER PUBLICATIONS

International Search Report dated May 17, 2007.

*Primary Examiner*—David P Bryant
*Assistant Examiner*—Ryan J Walters
(74) *Attorney, Agent, or Firm*—Ogilvy Renault LLP

(57) ABSTRACT

A method of manufacturing an internal manifold of a gas turbine engine including machining an annular channel in a ring by a turning process, and varying a position of a tool bit relative to the surface of the ring as a function of a relative circumferential location of the tool bit around the ring such that the channel has a cross-sectional area that varies around a circumference of the ring.

13 Claims, 6 Drawing Sheets

U.S. PATENT DOCUMENTS

| | | |
|---|---|---|
| 5,579,645 A | 12/1996 | Prociw et al. |
| 5,598,696 A | 2/1997 | Stotts |
| 5,771,696 A | 6/1998 | Hansel et al. |
| 5,848,525 A | 12/1998 | Spencer |
| 5,956,955 A | 9/1999 | Schmid |
| 5,979,205 A | 11/1999 | Uchida et al. |
| 5,983,642 A | 11/1999 | Parker et al. |
| 5,996,335 A | 12/1999 | Ebel |
| 6,109,038 A | 8/2000 | Sharifi et al. |
| 6,141,968 A | 11/2000 | Gates et al. |
| 6,149,075 A | 11/2000 | Moertle et al. |
| 6,240,732 B1 | 6/2001 | Allan |
| 6,256,995 B1 | 7/2001 | Sampath et al. |
| 6,463,739 B1 | 10/2002 | Mueller et al. |
| 6,627,837 B1 | 9/2003 | Carboneri et al. |
| 6,761,035 B1 | 7/2004 | Mueller |
| 2003/0014979 A1 | 1/2003 | Summerfield et al. |
| 2004/0123445 A1 | 7/2004 | Esaki et al. |
| 2005/0188699 A1 | 9/2005 | Prociw |

FOREIGN PATENT DOCUMENTS

| | | |
|---|---|---|
| CA | 2307186 | 5/1999 |

* cited by examiner

US 7,607,226 B2

INTERNAL FUEL MANIFOLD WITH TURNED CHANNEL HAVING A VARIABLE CROSS-SECTIONAL AREA

TECHNICAL FIELD

The present invention relates generally to gas turbine engines, and more particularly to gas turbine engine fuel manifolds and methods of manufacturing same.

BACKGROUND OF THE ART

In a gas turbine engine, an annular internal fuel manifold may be provided to distribute fuel to a plurality of fuel nozzles, for injection into a combustor.

Improvements in design and methods of manufacturing such internal fuel manifolds are continuously being sought, and are thus desirable.

SUMMARY OF THE INVENTION

It is an object of the present invention to provide an improved method for manufacturing an internal fuel manifold.

In one aspect, the present invention provides a method of manufacturing an internal manifold of a gas turbine engine, the method comprising: providing a solid ring; machining at least one annular channel in the ring using a turning process, including engaging a tool bit against a surface of the rotating ring; varying a position of the tool bit relative to the surface of the ring as a function of a relative circumferential location of the tool bit around the ring in accordance with a predetermined profile, such that the channel has a cross-sectional area that varies around a circumference of the ring; and sealingly fastening a sealing member to the ring to enclose the channel and define therewith at least one circumferential conduit having a cross-sectional area that varies around the circumference of the ring.

There is also provided, in accordance with another aspect of the present invention, a method of creating a channel having a varied cross-sectional area in an internal fuel manifold ring of a gas turbine engine, the method comprising: using a turning machine to rotate the ring and to machine an annular channel in a surface of the ring using a preselected tool bit, the machining including varying a position of the tool bit relative to the surface as a function of a relative circumferential location of the tool bit around the ring in accordance with a predetermined profile, such that the channel has a cross-sectional area that varies around a circumference of the ring.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
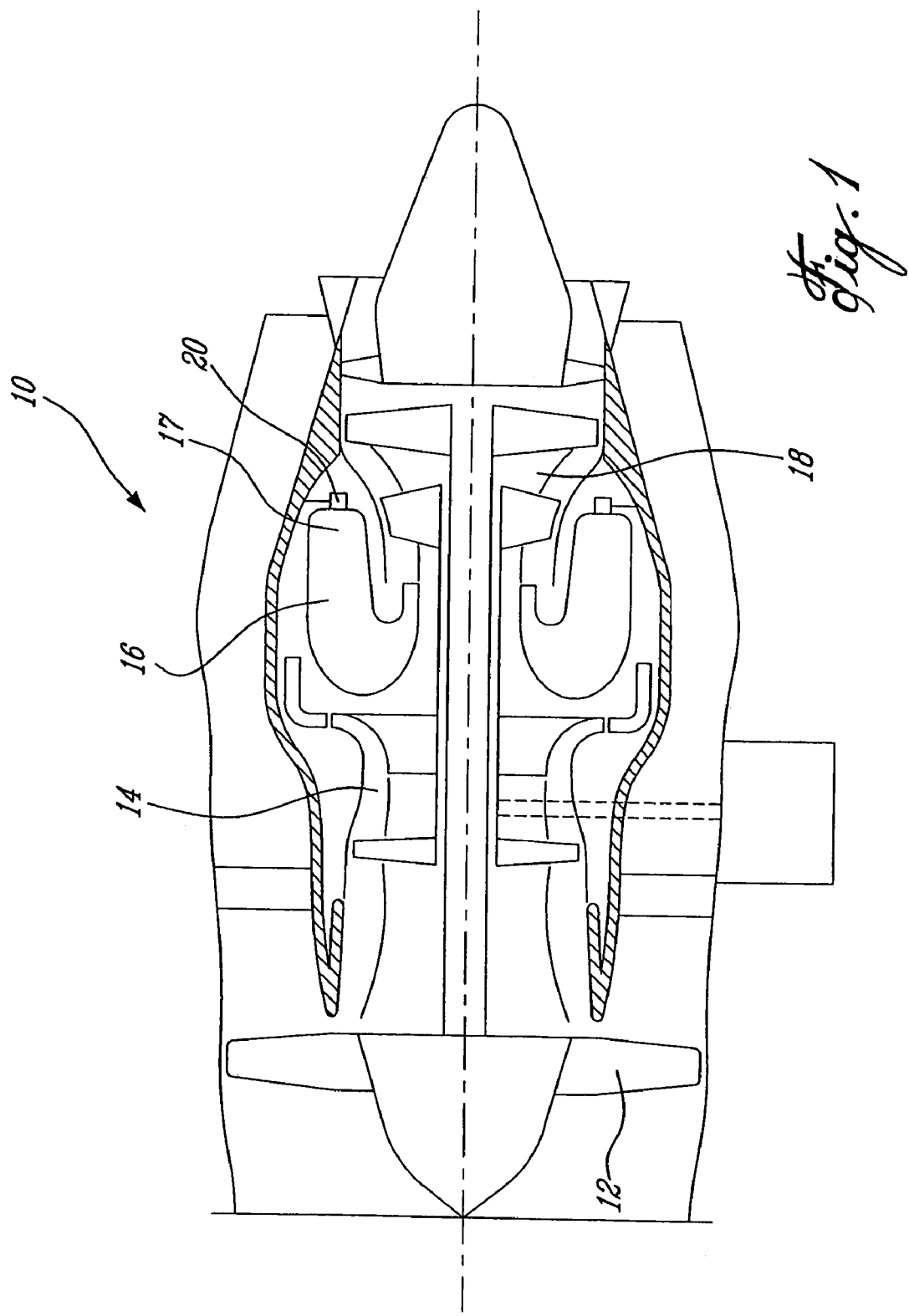
FIG. 1 is a schematic cross-sectional view of a gas turbine engine which can include a manifold according to a particular aspect of the present invention.

FIG. 1 illustrates a gas turbine engine 10 generally comprising, in serial flow communication, a fan 12 through which ambient air is propelled, a multistage compressor section 14 for pressurizing the air, a combustion section 16 in which the compressed air is mixed with fuel atomized into a combustion chamber 17 by a fuel injection system comprising a fuel injection nozzle assembly 20, the mixture being subsequently ignited for generating hot combustion gases before passing through a turbine section 18 for extracting energy from the combustion gases.

Figure 2:
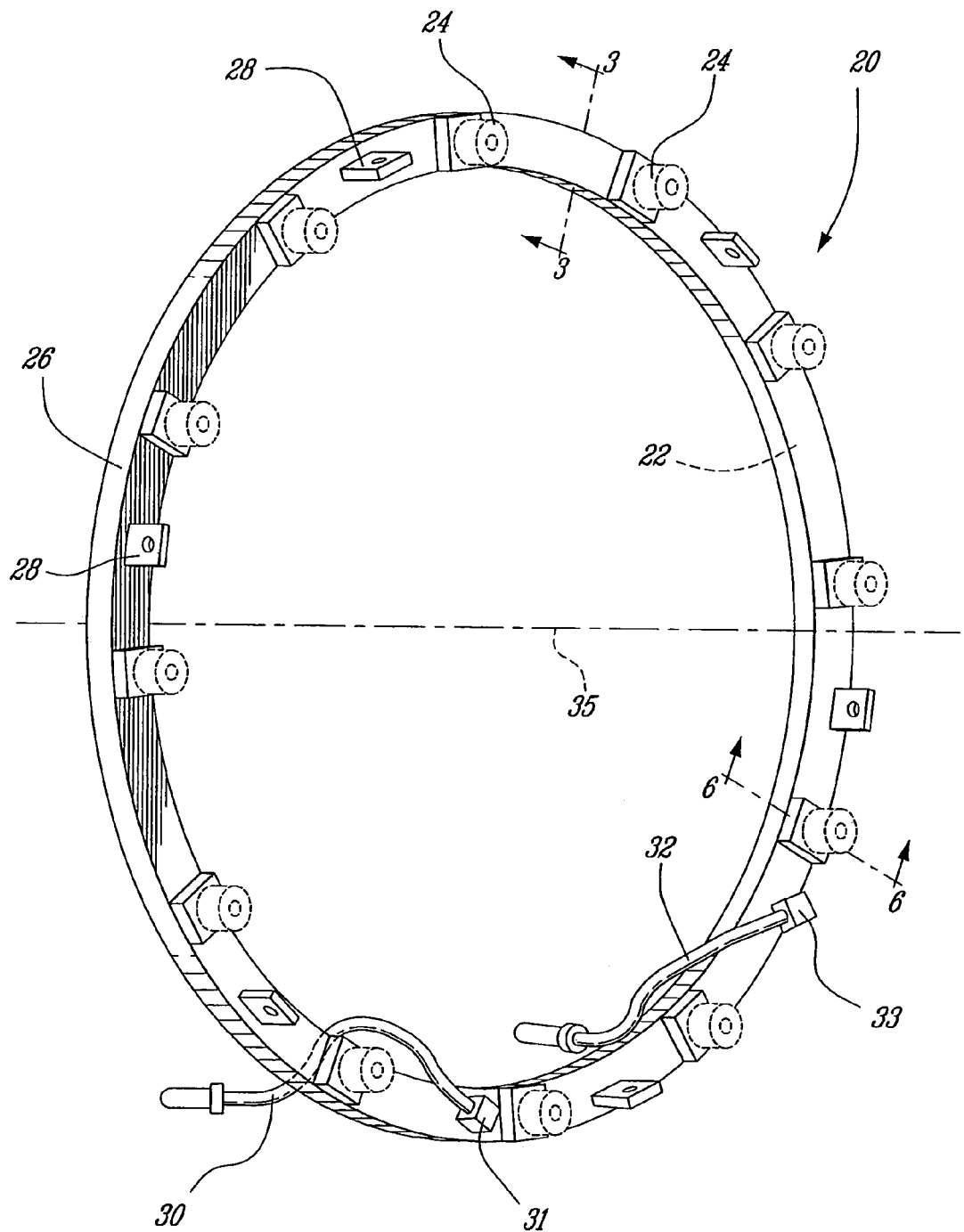
FIG. 2 is a perspective view of a fuel injection system including an internal fuel manifold according to a particular aspect of the present invention.

Referring to FIG. 2, the fuel injection nozzle assembly 20 comprises an annular fuel manifold ring 22 generally disposed adjacent the combustion chamber 17 (see FIG. 1) of the engine, and mounted via several integral attachment lugs 28 for fixing the annular ring 22 to an appropriate support structure. The annular fuel manifold ring 22 comprises a plurality of fuel injector spray tip assemblies 24 thereon, which atomize the fuel for combustion. The exterior of the annular ring 22 comprises an outer heat shield 26 covering the ring. This provides the fuel manifold ring 22 thermal protection from the high temperature environment of the combustion chamber 17. A primary fuel inlet pipe 30 and a secondary fuel inlet pipe 32, via inlets 31 and 33, respectively, provide dual though independent fuel feeds to manifold 22, which then distributes the two fuel supplies to the spray tip assemblies 24. The spray tip assemblies 24 can be directly mounted to the annular fuel manifold ring 22, i.e. without being interconnected thereto through corresponding nozzle stems.

Figure 3:
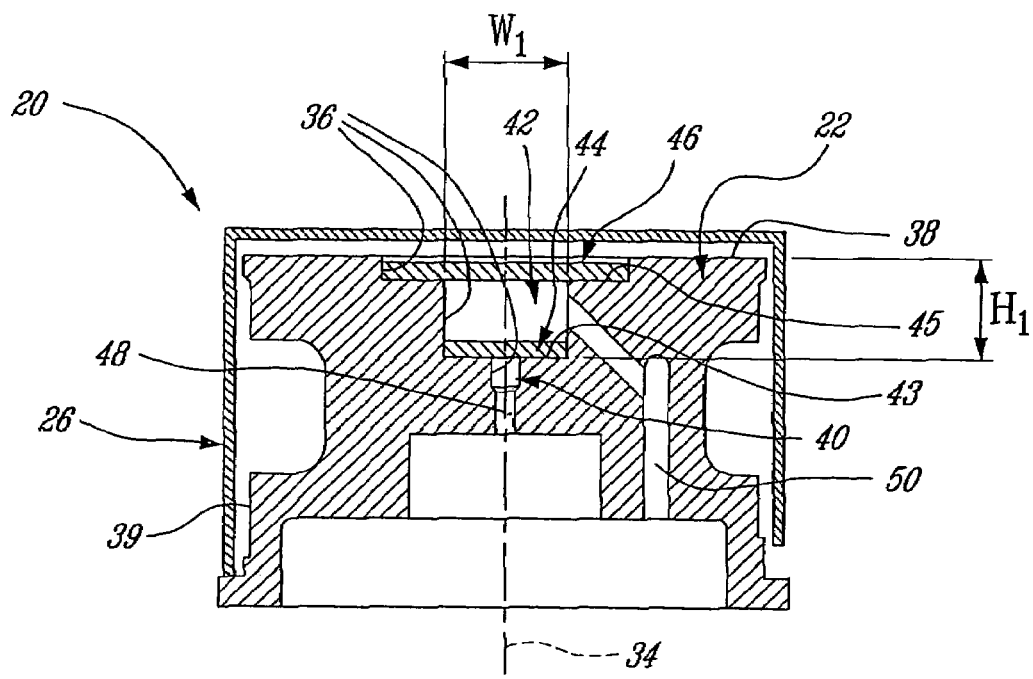
FIG. 3 is a cross-sectional view of the manifold of FIG. 2 taken along line 3-3.

Referring now to FIG. 3, the annular fuel manifold ring 22 can be formed from a single solid piece of material and, in the particular embodiment shown, comprises a single stepped channel 36 formed in an outer peripheral surface 38 of the manifold ring 22. The annular stepped channel 36 defines at least two nested fuel conduits, namely a primary nested fuel conduit 40 and a secondary nested fuel conduit 42. The annular primary fuel conduit 40 is located in the manifold ring 22 closest to the spray tip assemblies 24, and preferably (to facilitate manufacture) is much smaller in cross-sectional area than the annular secondary nested fuel conduit 42, which opens immediately to the peripheral surface 38 in which the stepped channel 36 is formed.

Although shown as defined in the outer peripheral surface 38, i.e. the surface extending substantially radially with respect to a central axis 35 of the ring 22, the stepped channel 36 can alternately be formed in a circumferential surface of the ring 22, for example in outer circumferential surface 39.

A first inner sealing member or plate 44, sized such that it fits within the secondary conduit 42 of the stepped channel 36 and is larger than the width of the primary conduit 40 (i.e. to seal it), is fixed against a first shoulder 43 formed in the stepped channel 36 between the primary and secondary nested conduits 40, 42, by way of brazing or another fastening/sealing method. The first inner sealing member 44 can be an annular ring plate, substantially extending around the full circumference of manifold ring 22. An outer sealing member or plate 46 is similarly fixed to the fuel manifold ring 22 by brazing or other similar fastening method, against a second shoulder 45 formed within the stepped channel 36 for receiving the annular outer sealing member 46 abutted therein. The outer sealing member 46 could also be brazed directly to the outer peripheral surface 38 of the manifold ring, without the need for the second shoulder 45 in the stepped channel 36. The two sealing members 44, 46 thereby divide the single stepped channel 36 into two discrete, nested fuel conduits that are sealed from one another and which can supply independent fuel supplies to the spray tip assemblies 24, i.e. primary nested fuel conduit 40 and secondary nested fuel conduit 42.

Figure 9:
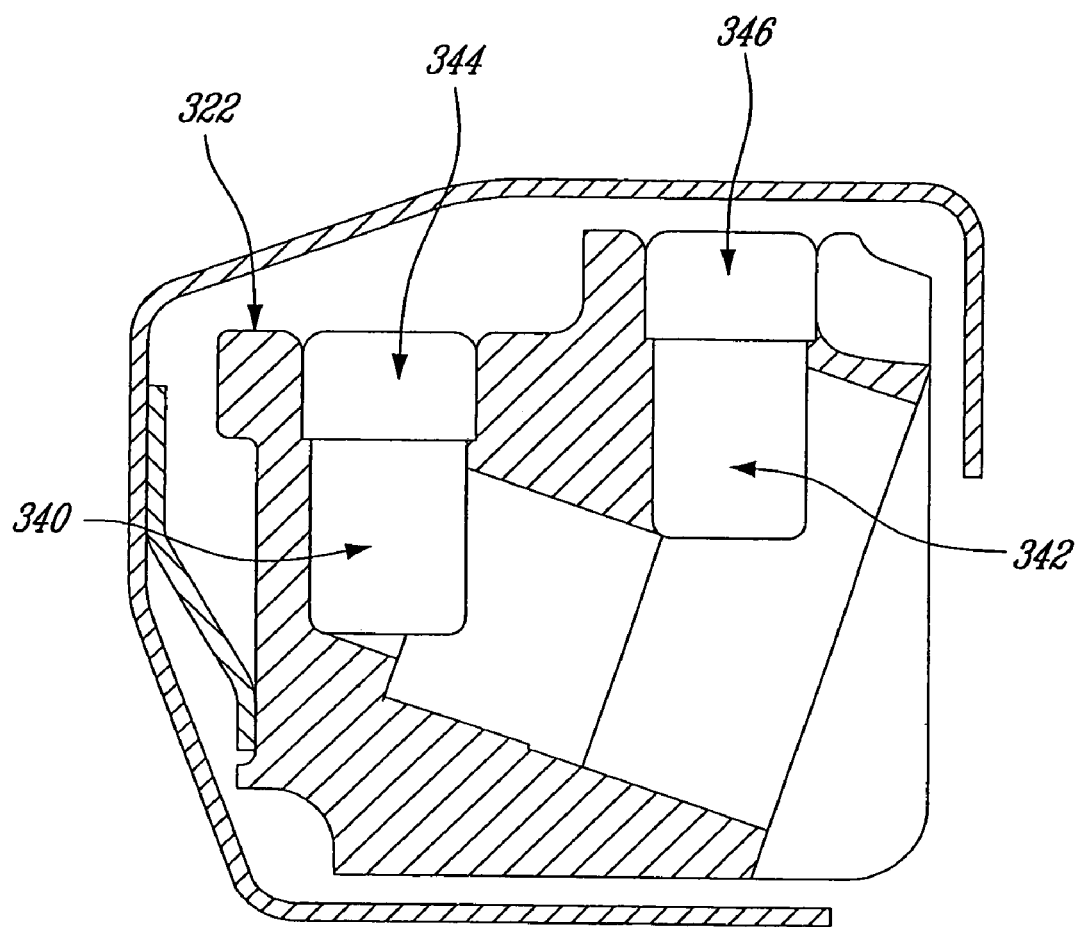
FIG. 9 is a cross-sectional view of an internal fuel manifold according to another alternate aspect of the present invention.

The present invention is not limited to stepped channels, nor to the specific shoulder+sealing plate configuration described in the examples therein, but rather is applicable to any suitable annular internal manifold configuration. For example, FIG. 9 depicts another internal manifold in which in which two fuel flow channels 340 and 342 are formed within an outer surface of the manifold ring 322, the channels 340 and 342 being respectively enclosed and sealed by two sealing members 344 and 346 which are each received within the walls of the respective channel and fastened therein to define the enclosed fuel conduits. These channels 340,342 can be formed by turning (i.e. using a lathe) in accordance with the manufacturing method of the present invention as described in further detail below. Thus, regardless of the channel and sealing plate configuration and design, the channels formed within the annular fuel manifold ring can be formed using the turning method of the present invention.

The primary and secondary annular nested fuel conduits 40 and 42 permit circumferential distribution of the primary and secondary fuel supply around the fuel manifold ring 22. At the location of each spray tip assembly 24 mounted to the annular manifold ring 22, fuel outlet passage holes are formed, by drilling or otherwise, in the manifold ring body substantially perpendicularly to the outer peripheral surface 38, to enable fluid flow communication between the nested fuel conduits 40, 42 and the spray tip assembly 24. Specifically, primary fuel conduit outlet passage 48 permits primary fuel flow from the primary fuel conduit 40 to be fed into the primary distributor (not shown) of the spray tip assembly 24, and secondary fuel conduit outlet passage 50 permits secondary fuel flow from the secondary fuel conduit 42 to be fed into the annular secondary fuel swirling cavity (not shown) of the spray tip assembly 24.

Typically, the grooves produced by milling or routing would have a uniform cross-sectional area all around the ring. However, with a channel having a uniform cross-sectional area, fuel velocity is lost as the fuel progresses further around the ring away from the inlet point and past each successive exit point (e.g. nozzle tips). Ideally, fuel velocity inside the fuel channel should be maintained at a level sufficient to avoid excessive heat pickup and fuel coking. To that effect, the manifold preferably has grooves which, for example, have an increased cross-sectional area in proximity of the inlet, or might preferably have a continuously decreasing cross-section around the circumference away from the inlet, to maintain fuel velocity as fuel volume decreases. Traditionally, the changes in cross-sectional area require relatively complex and/or expensive operation, such as additional milling, electrochemical machining, electric discharge machining, etc.

Figure 8:
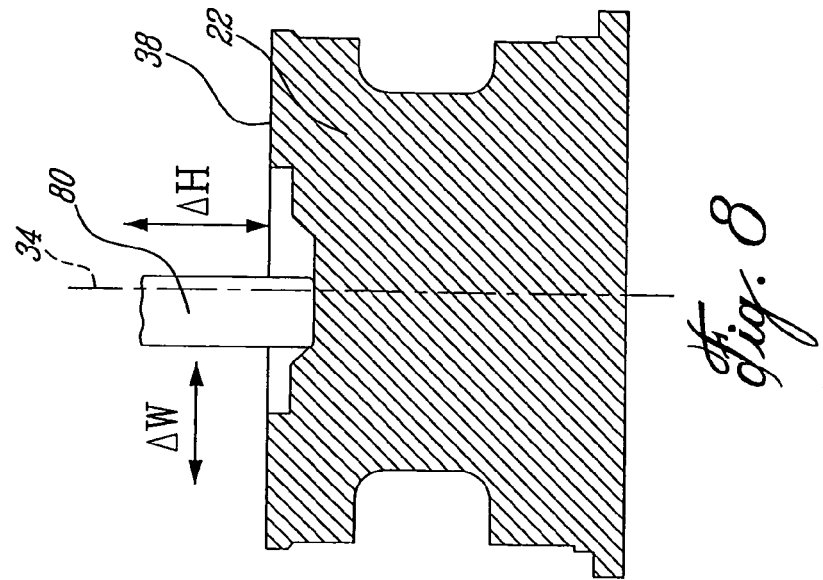
FIG. 8 is a schematic, cross-sectional view of the manifold ring of FIG. 2 during manufacture following the method of FIG. 7.
Figure 7:
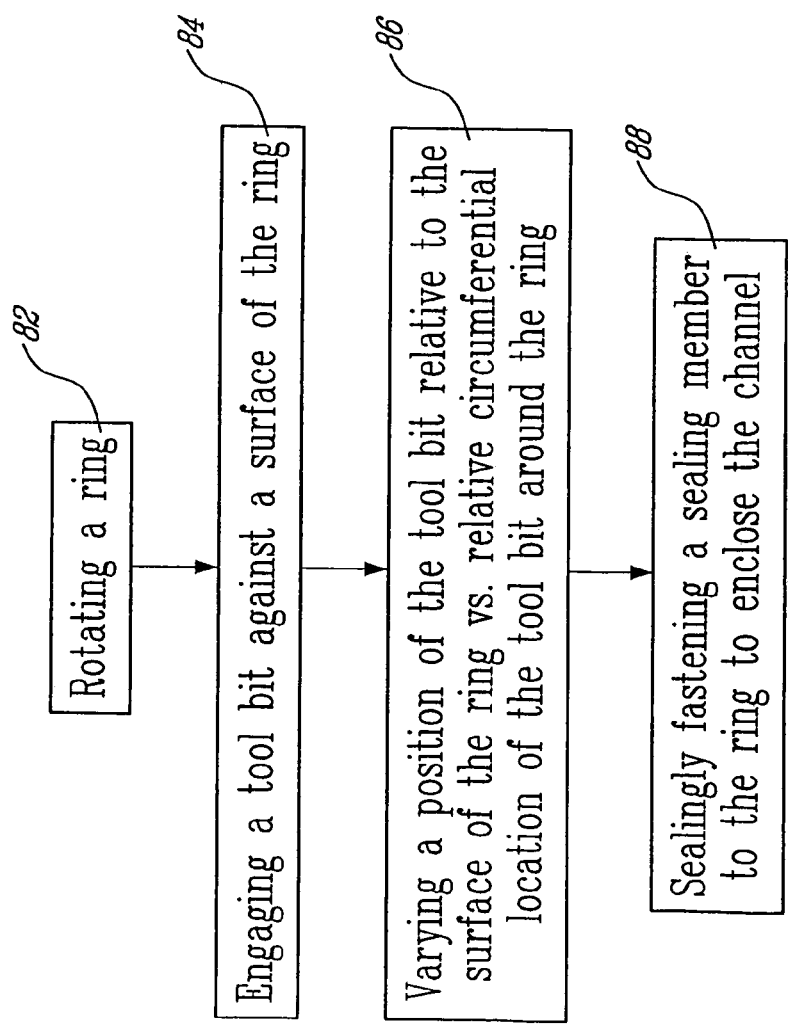
FIG. 7 is a schematic diagram of the method steps used in accordance with one aspect of the present invention to manufacture an internal fuel manifold.

In the present invention, the stepped channel 36 is formed by a turning process, either using a multi-diameter bit having a shoulder corresponding to the shoulder 43 between the two nested fuel conduits 40, 42, or by successive passages with either a same bit or a different bit to separately define the secondary fuel conduit 42 and the primary fuel conduit 40. Referring to FIGS. 7 and 8, the stepped channel 36 or, if formed separately, each fuel conduit 40, 42, is formed according to the following method. The ring 22 is turned about its central axis 35, as indicated in step 82. A tool bit 80 is engaged against the surface to be machined, as indicated in step 84, which in the embodiment shown is the outer peripheral surface 38 but can alternately be another surface such as the outer circumferential surface 39 (see FIG. 3). The position of the tool bit 80 relative to the surface 38 being machined is varied as a function of the relative circumferential location of the tool bit 80 around the ring 22, as indicated in step 86. The conduits 40, 42 are then defined by sealingly fastening the respective sealing members 44, 46 (see FIG. 3) to the ring 22 to enclose the channel 36, as indicated in step 88.

Figure 6:
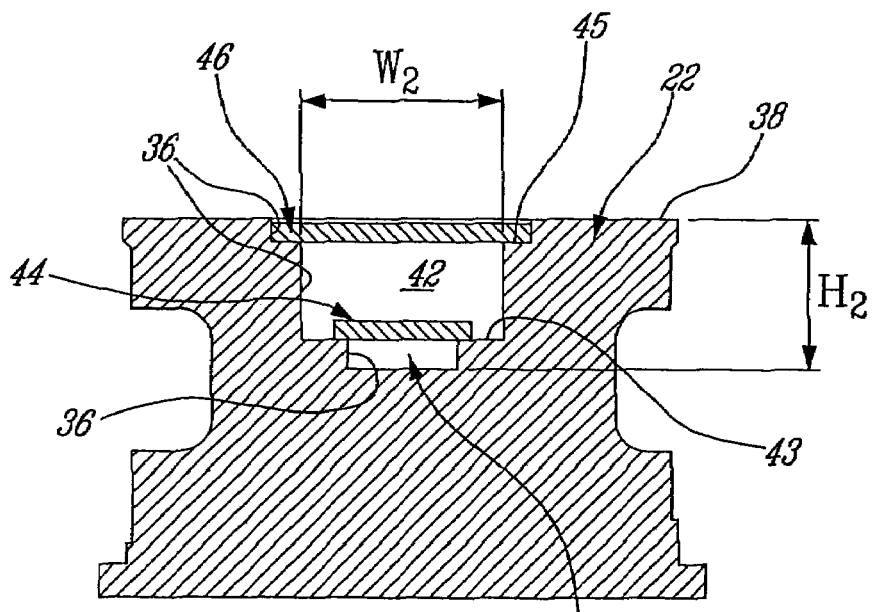
FIG. 6 is a cross-sectional view of the manifold ring of FIG. 2 taken along lines 6-6.

In the embodiment shown, the variation of the position of the tool bit 80 in step 86 includes varying the depth of the tool bit 80 within the ring 22 as indicated by ΔH in FIG. 8, either in a continuous manner or in discrete steps, following a depth profile established as a function of the relative circumferential location of the tool bit 80 around the ring 22. In one aspect, the depth is varied in a progressive manner, e.g. between a maximum depth and a minimum depth defined near in spaced apart locations of the channel 36. In an alternate aspect, the depth is varied between a series of alternating maximum and minimum depths, depending of the desired fuel velocity and/or flow rate distribution around the ring 22. Thus, the tool bit 80 forms the channel 36 with a variable depth, with, for example, the depth $H_2$ of the channel 36 near the inlets 31, 33 (as shown in FIG. 6) being greater than the depth $H_1$ of the channel 36 away from the inlets 31, 33 (as shown in FIG. 3).

In the embodiment shown, the variation of the position of the tool bit 80 in step 86 also includes varying a distance between the tool bit 80 and the central axis 34 of the machined ring surface 38 differently during at least two different passes of the tool bit 80 around the ring 22 as indicated by ΔW in FIG. 8, either in a continuous manner or in discrete steps, such as to obtain a width profile established as a function of the relative circumferential location of the tool bit 80 around the ring 22. Similarly to the depth profile, the width profile can vary in a progressive manner, between a maximum width and a minimum width defined for example near opposed ends of the channel 36, or alternately between a series of alternating maximum and minimum widths. Thus, the tool bit 80 forms the channel 36 with a variable width, with, for example, the width $W_2$ of the channel 36 near the inlets 31, 33 (as shown in FIG. 6) being greater than the width $W_1$ of the channel 36 away from the inlets 31, 33 (as shown in FIG. 3).

Alternately, the variation of the position of the tool bit 80 in step 86 can include only one of the height variation and the width variations described above, or any other appropriate type of position variation required.

Thus, by manufacturing the annular fuel manifold ring 22 by a turning process (e.g. using a lathe) and varying a position of the tool bit 80 with respect to the ring surface being machined, which in the embodiment shown is the outer peripheral surface 38, the channel 36 is formed easily and cost effectively with a cross-sectional area that varies, either continuously or in discrete steps, around the circumference of the ring 22. This allows for the easy creation of blockages in the flow at desired points and subsequent continuation of the channel for weight reduction and/or dynamic balancing. In a particular aspect, the channel 36 extends around at least half the circumference of the ring 22 and is machined using the above-described method to obtain a cross-sectional area progressively varying between a maximum near the inlets 31, 33 and a minimum away from the inlets 31, 33, the maximum and minimum being located at diametrically opposed, or substantially diametrically opposed, locations around the ring, such that the fuel velocity can be maintained throughout the channel 36 to avoid excessive heat pickup and fuel coking. The variable cross-sectional area channel 36 can thus be manufactured using a relatively simple and cost-effective process when compared to other types of process such as, for example, milling, electrochemical machining, electric discharge machining, etc., which reduces the manufacturing time and costs.

Figure 4:
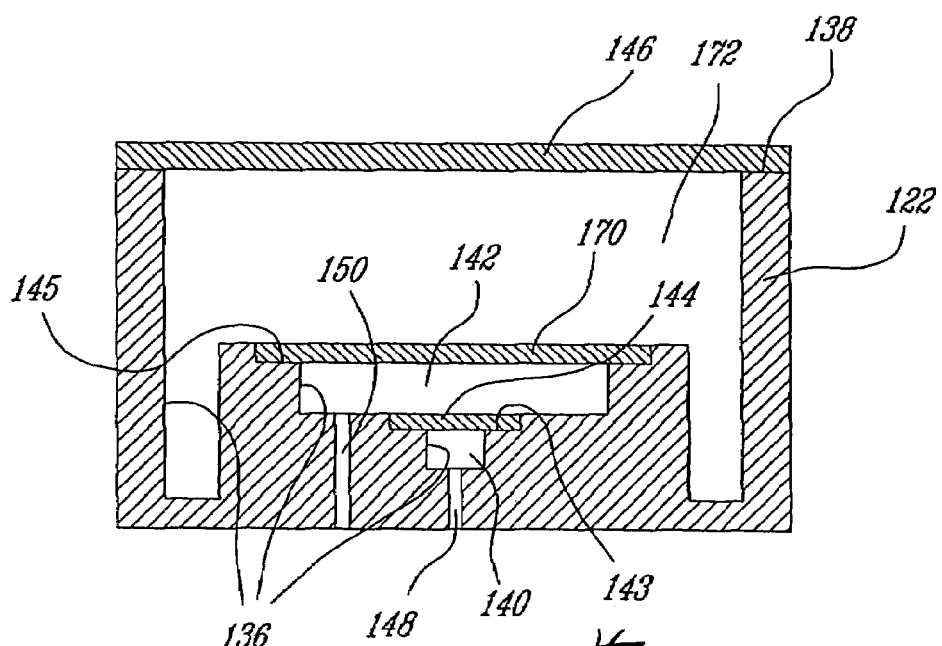
FIG. 4 is a cross-sectional view of a manifold according to an alternate aspect of the present invention.

The above described manufacturing process can also be used to produce manifold rings having an alternative configuration. For example, referring to FIG. 4, an alternately-shaped stepped channel 136 is machined in the manifold ring 122, which can be formed from a single solid piece of material. The stepped channel 136 comprises an additional or auxiliary channel 172 therein. As above, a primary nested fuel conduit 140 is formed by fixing a first inner annular sealing member or plate 144 against a first shoulder 143, thereby dividing the primary fuel conduit 140 from a secondary nested fuel conduit 142. The secondary nested fuel conduit 142 is enclosed by a second inner sealing member or plate 170 abutted with, and fixed against, second shoulder 145 within the stepped channel 136. The annular auxiliary channel 172 is further axially enclosed by an outer sealing member or plate 146, fixed against an outer peripheral surface 138 of the annular fuel manifold ring 122. As described above, in a particular aspect brazing is used to fixing the sealing members 144, 146, 170 to the manifold ring 122, although several alternative attachment and sealing methods can be used. A primary conduit outlet passage 148 and a secondary conduit outlet passage 150, formed in the manifold ring 122 perpendicularly to the outer peripheral surface 138 at predetermined circumferential locations of the manifold ring 122 corresponding to location of the spray tip assemblies 24, provide dual independent fuel feeds to each spray tip assembly 24.

The auxiliary channel 172 can be used to carry a coolant, such as for example recirculated fuel, which will draw heat from the ring 122. The coolant flow in the auxiliary channel 172 is independent of the quantity of fuel being delivered to the engine. This is particularly needed during low power operation, when less fuel flows through the conduits of the manifold, and therefore more heat is absorbed from the combustion chamber 17 by the entire manifold ring 122. This reduces fuel coking within the fuel manifold, which can occur if sufficient fuel flow is not maintained to cool the manifold ring 122. Each conduit, namely the primary fuel conduit 140, the secondary fuel conduit 142 and the auxiliary cooling conduit 172, has its own inlet feed line, such that the fuel rates and the coolant flow rate can be independently controlled. Independent control of the primary and secondary fuel flows and independent feeding of each spray tip 24 from the annular conduits providing circumferential fuel distribution also permit fuel staging, wherein specific amounts of fuel are partitioned to specific circumferential locations of the combustion chamber to enhance ignition or to control emissions.

The channel 136 is formed by a turning process to have a cross-sectional area that varies around the circumference of the ring 122 as described above, i.e. by varying a position of the tool bit relative to the surface of the ring 122 being machined as a function of the relative circumferential location of the tool bit around the ring 122. The depth of the tool bit within the ring 122 is varied as the ring 122 turns about its central axis, either in a continuous manner or in discrete steps, such that the depth of the channel 136 varies around the circumference of the ring 122, for example between a maximum depth near the inlets and a minimum depth away from the inlets. A distance between the tool bit and the central axis of the machined surface (here, surface 138) is also varied differently during at least two different passes of the tool bit around the ring 122, either in a continuous manner or in discrete steps, such that the width of the channel 136 is varied around the circumference of the ring 122, for example between a maximum width near the inlets and a minimum width away from the inlets. Alternately, only one of the depth and width of the channel 136 is varied around the circumference of the ring 122.

Figure 5:
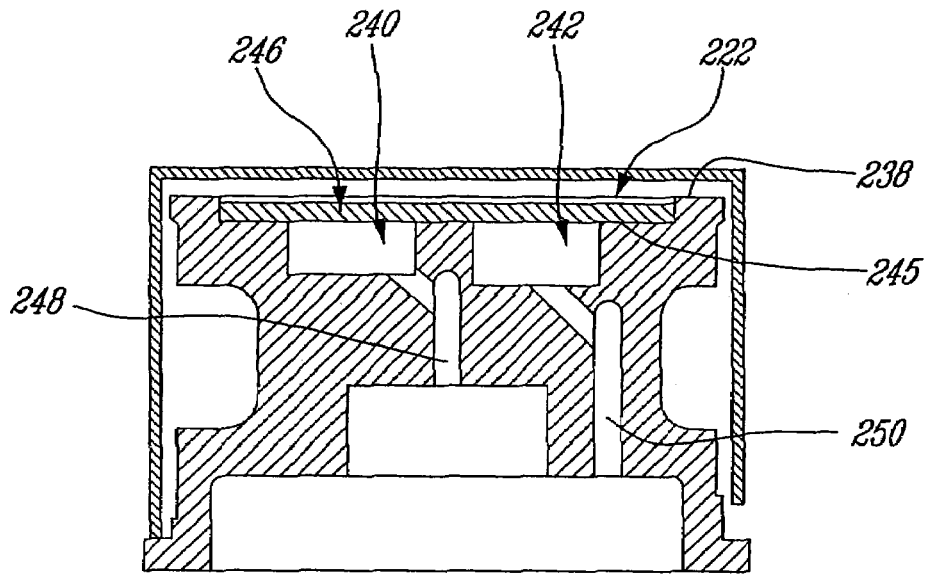
FIG. 5 is a cross-sectional view of a manifold according to another alternate aspect of the present invention.

Referring to FIG. 5, another alternate manifold ring 222 can also be manufactured through a similar process. Manifold ring 222 includes two separate channels defined therein side by side, namely primary channel 240 and secondary channel 242. As above, an annular sealing member or plate 246 is abutted with, and fixed against, a shoulder 245 common to both channels 240, 242. The channels 240, 242 could alternately be sealed with separate members. Also as above, a primary conduit outlet passage 248 and a secondary conduit outlet passage 250, formed in the manifold ring 222 perpendicularly to an outer peripheral surface 238 thereof at predetermined circumferential locations of the manifold ring 222 corresponding to location of the spray tip assemblies 24, provide dual independent fuel feeds to each spray tip assembly 24. The channels 240, 242 are also formed by a turning process similar to that described above, i.e. by varying a position of the tool bit relative to the surface of the ring 222 being machined as a function of the relative circumferential location of the tool bit around the ring 222, such as to obtain channels 240, 242 having a variable depth and/or variable width such as, for example, to have a greater cross-sectional area of the channels 240, 242 near the fuel inlets.

The above description is meant to be exemplary only, and one skilled in the art will recognize that changes may be made to the embodiments described without department from the scope of the invention disclosed. For example, the variable depth and/or variable width turning process described can be applied to multiple alternate channel configurations, whether for a single of multiple conduits, such as to have channels with a variable cross-sectional area throughout their length to better control the fuel flow therethrough. Still other modifications which fall within the scope of the present invention will be apparent to those skilled in the art, in light of a review of this disclosure, and such modifications are intended to fall within the appended claims.

What is claimed is:

1. A method of manufacturing an internal manifold of a gas turbine engine, the method comprising:

providing a solid ring;

machining at least one annular channel in the ring using a turning process, including:

rotating the ring about a central axis thereof;

forming the annular channel with a cross-sectional area that varies around a circumference of the ring by engaging a tool bit with a peripheral surface of the rotating ring to remove material from said surface to provide said channel defined in said surface, and varying a position of the tool bit relative to the surface of the ring while said ring is rotated and the tool bit engaged with said surface in accordance with a predetermined channel area profile to thereby provide the channel with a varying cross-sectional area around the ring circumference; and sealingly fastening a sealing member to the ring to enclose the channel and define therewith at least one circumferential conduit having a cross-sectional area that varies around the circumference of the ring.

2. The method as defined in claim 1, wherein the peripheral surface is planar and substantially normal to the central axis of said ring, the step of varying a position of the tool bit includes varying a depth of the tool bit within the ring in a axial direction substantially parallel to said central axle, the predetermined profile being a depth profile, such that the channel has a depth that varies around the circumference of the ring.

3. The method as defined in claim 1, wherein the cross-sectional area of the channel is varied progressively between a maximum cross-sectional area defined in proximity of an inlet of the channel and a minimum cross-sectional area defined away from the inlet.

4. The method as defined in claim 1, wherein the step of varying a position of the tool bit includes varying a cutting depth of the tool bit within the ring during a first rotation of the ring relative to the tool bit differently than within the ring during a second rotation of the ring relative to the tool bit disposed at a different position, the predetermined profile being a width profile, such that the cross-sectional area of the channel is varied by varying a width of the channel around the circumference of the ring.

5. The method as defined in claim 1, wherein a plurality of such channels are machined.

6. The method as defined in claim 1, wherein the position of the tool bit is varied in a continuous manner.

7. The method as defined in claim 1, wherein the position of the tool bit is varied in a stepped manner.

8. The method as defined in claim 1, wherein the position of the tool bit is varied such as to have a channel with a cross-sectional area varying continuously between a maximum cross-sectional area defined in proximity of an inlet of the channel and a minimum cross-sectional area defined away from the inlet.

9. The method as defined in claim 3, wherein the maximum cross-sectional area and the minimum cross-sectional area are defined at substantially diametrically opposed locations on the ring.

10. The method as defined in claim 1, wherein the channel is machined around part of the circumference of the ring, and the method further includes the step of machining at least one additional channel around a remaining part of the circumference of the ring, the position of the tool bit relative to the ring being varied as a function of the relative circumferential location of the tool bit such that the additional channel also has a cross-sectional area that varies around the circumference of the ring.

11. An annular internal fuel manifold made in accordance with the method of claim 1.

12. A method of creating a channel having a varied cross-sectional area in an internal fuel manifold ring of a gas turbine engine, the method comprising: using a turning machine to rotate the ring about a central axis thereof and to machine an annular channel in a peripheral outer surface of the ring using a preselected tool bit by engaging the tool bit with the peripheral outer surface of the rotating ring to remove material from said surface, the machining including forming the channel with a cross-sectional area that varies around a circumference of the ring by varying a position of the tool bit while said ring is rotated in accordance with a predetermined profile.

13. The method of claim 12, wherein the peripheral outer surface is planar and substantially normal to said central axis about which the ring is rotated, the step of machining the annular channel further comprising displacing the tool bit in at least an axial direction substantially parallel to said central axis to remove material from the peripheral outer surface of the rotating ring, thereby forming the annular channel with a depth that varies around the circumference of the ring.

\* \* \* \* \*